March 28, 1939.   A. HENDERSON   2,152,189
STEEL CONSTRUCTION
Filed April 23, 1936   5 Sheets-Sheet 1
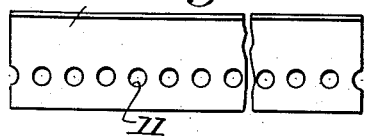
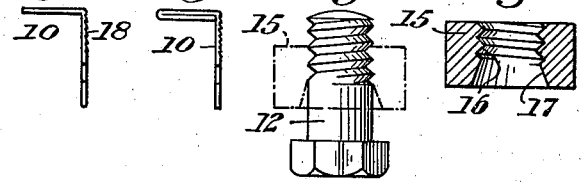
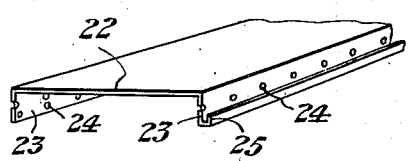
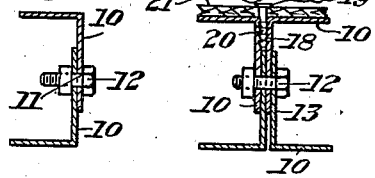
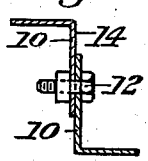
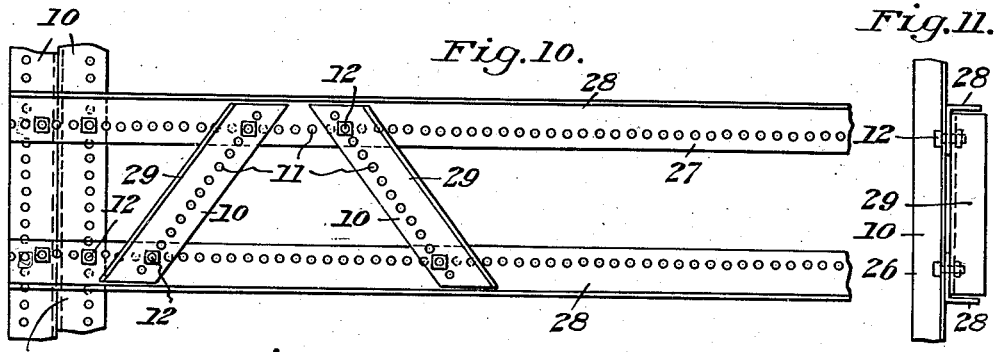
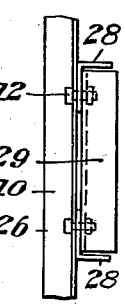
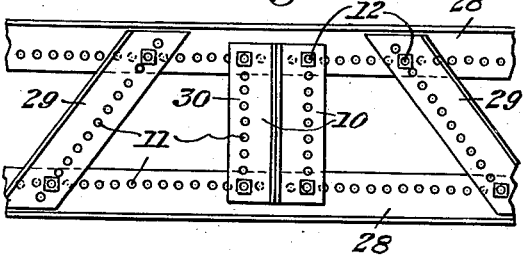
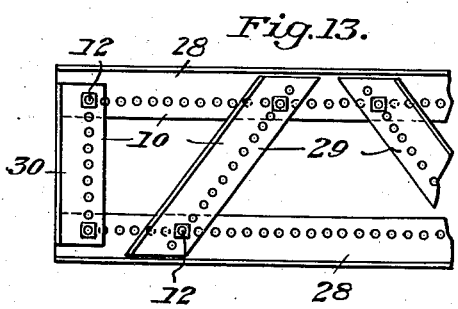
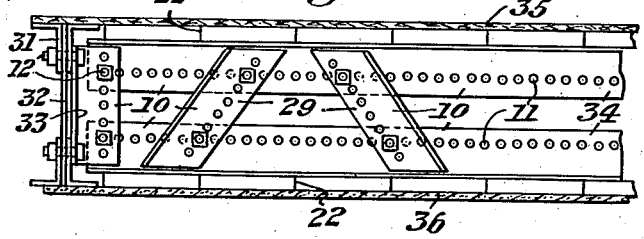
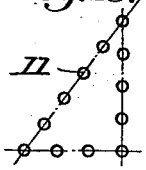
INVENTOR:
Albert Henderson
BY Stebbins Blenko & Parmelee
ATTORNEYS March 28, 1939. A. HENDERSON 2,152,189
STEEL CONSTRUCTION
Filed April 23, 1936 5 Sheets-Sheet 2
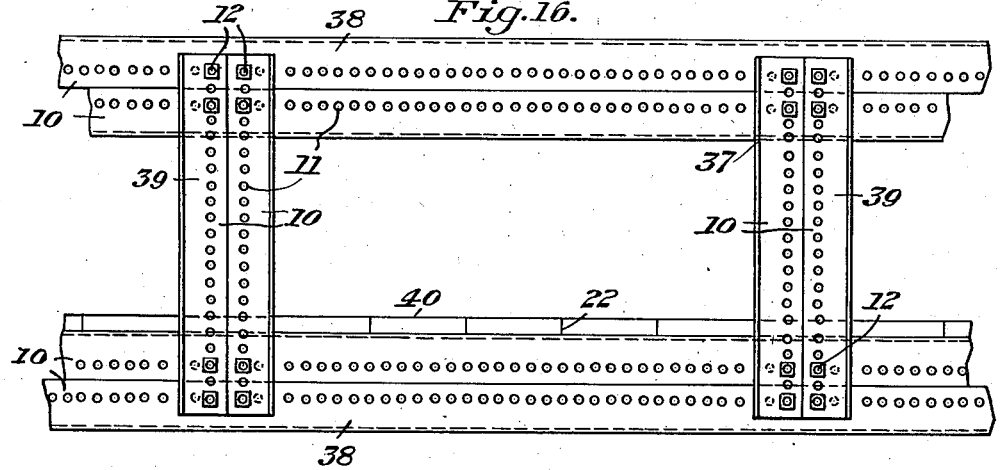
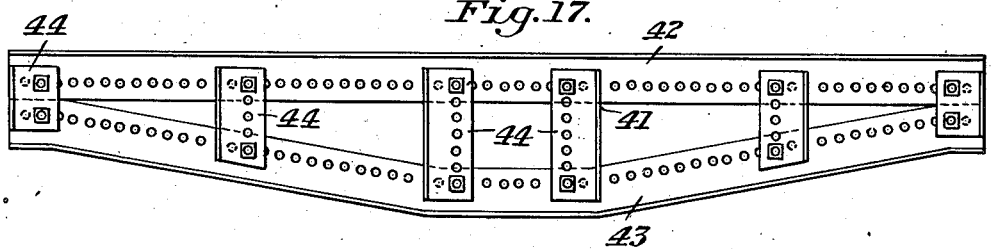
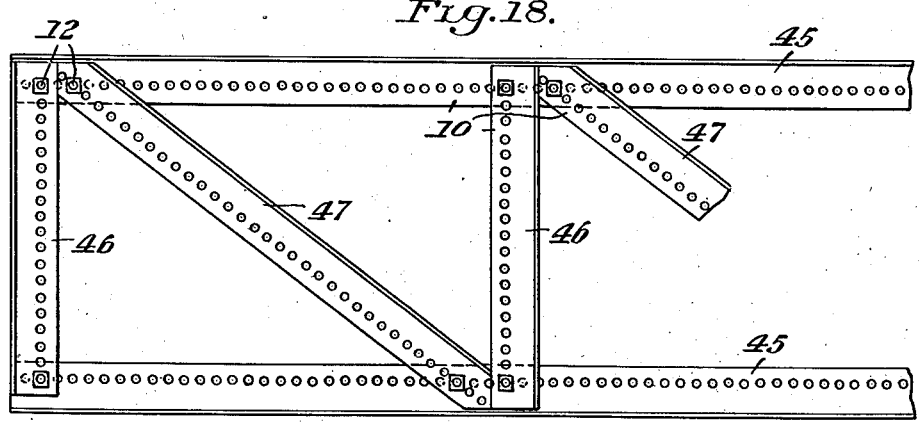
INVENTOR:
Albert Henderson
BY Stebbins Blenko & Parmelee
ATTORNEYS March 28, 1939.　　A. HENDERSON　　2,152,189
STEEL CONSTRUCTION
Filed April 23, 1936　　5 Sheets-Sheet 3
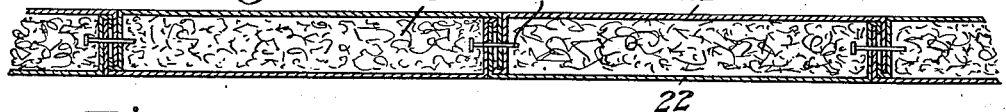
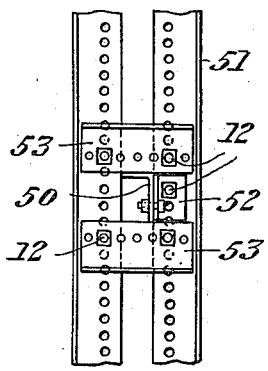
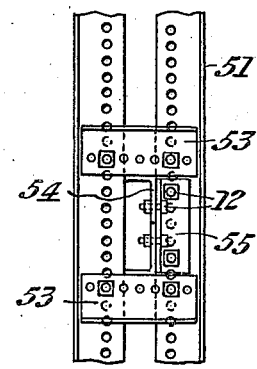
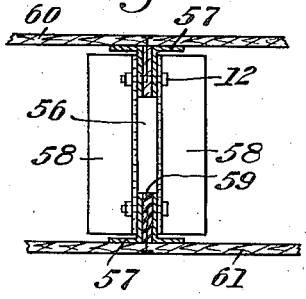
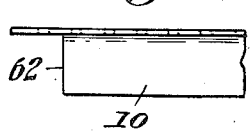
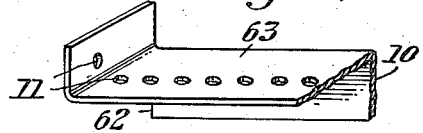
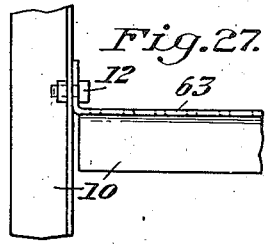
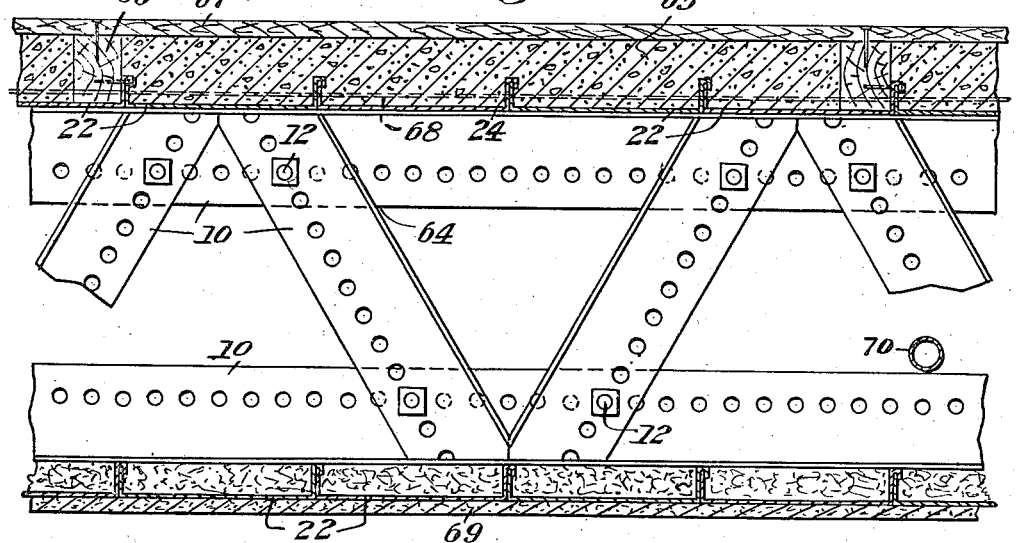
INVENTOR:
Albert Henderson
BY Stebbins, Blenko & Parmelee
ATTORNEYS March 28, 1939.  A. HENDERSON  2,152,189
STEEL CONSTRUCTION
Filed April 23, 1936    5 Sheets-Sheet 4
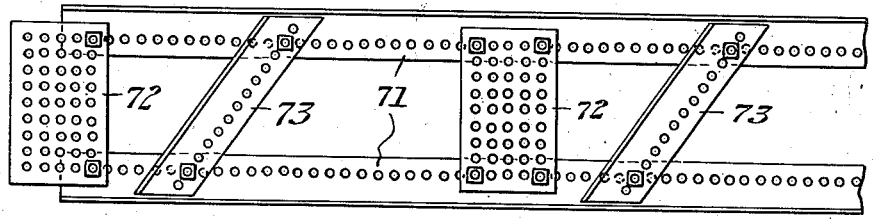
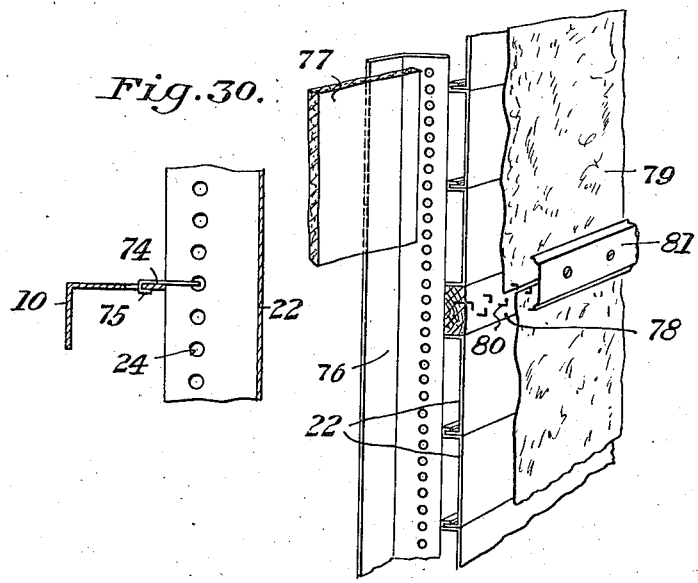
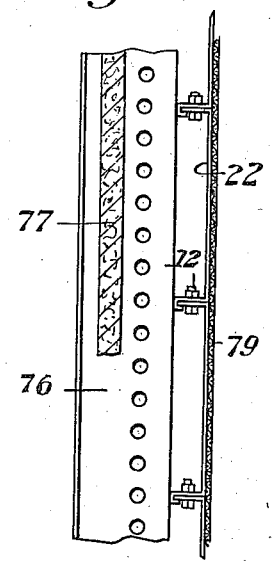
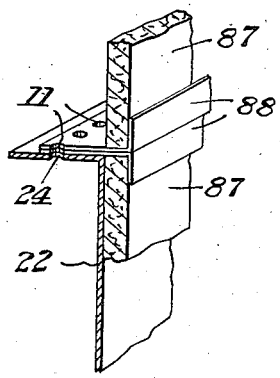
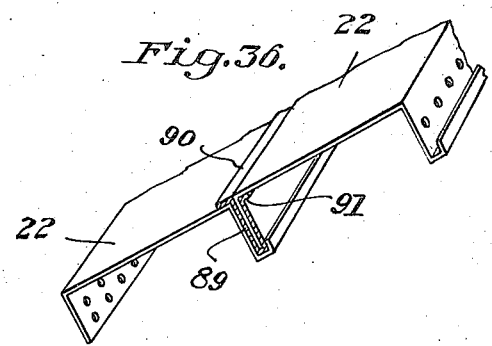
INVENTOR:
Albert Henderson
BY Stebbins Blenko & Parmelee
ATTORNEYS March 28, 1939.  A. HENDERSON  2,152,189
STEEL CONSTRUCTION
Filed April 23, 1936   5 Sheets-Sheet 5
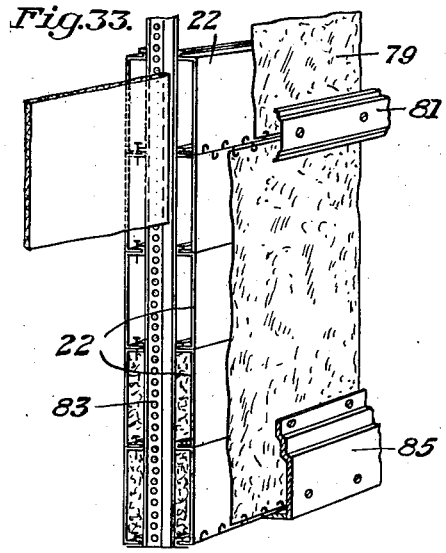
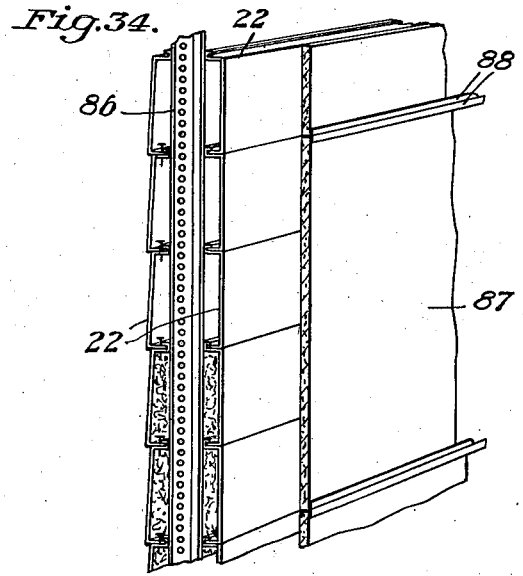
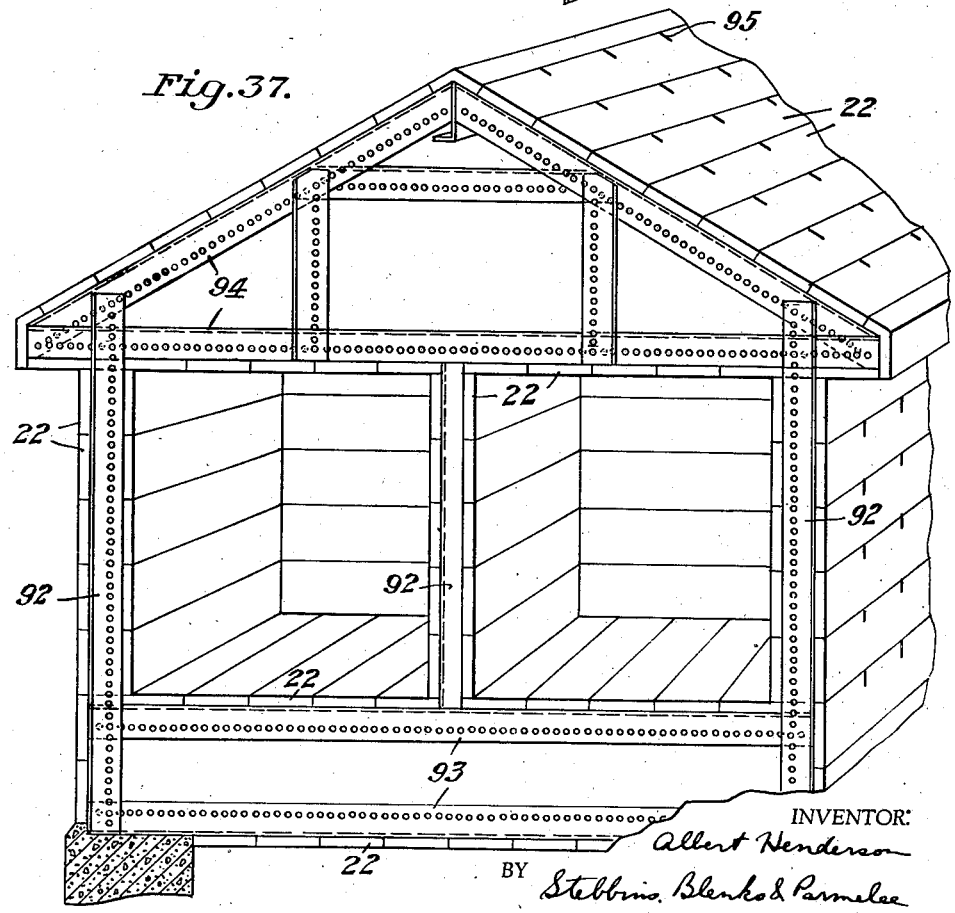
INVENTOR:
Albert Henderson
BY Stebbins, Blenko & Parmelee
ATTORNEYS Patented Mar. 28, 1939

2,152,189

UNITED STATES PATENT OFFICE 2,152,189

STEEL CONSTRUCTION

Albert Henderson, Pittsburgh, Pa., assignor to William P. Witherow, Pittsburgh, Pa.

Application April 23, 1936, Serial No. 75,984

2 Claims. (Cl. 189—37)

This invention relates to steel construction, and, particularly, to the use of simple light weight structural elements which can conveniently be assembled by relatively unskilled labor to provide structures of various types.

The object of this invention is to provide various types of structures and structural members by assembling relatively simple elemental members in a variety of forms. In accordance with the invention, I construct frame members of different types by building up simple angles into composite members. The angles, as disclosed in the copending application are provided with perforations spaced uniformly along one leg, at a constant distance from the edge thereof. The widths of the angle legs are preferably two and three times, respectively, the spacing between the holes which are formed in the longer legs.

This invention also contemplates the provision of light, yet strong sheathing members formed of sheet metal and adapted to cooperate with the frame members previously mentioned.

For a complete understanding of the invention, reference is made to the accompanying drawings illustrating preferred embodiments of the various elements, together with certain modifications, and a few of the forms of structures which may be erected with the aid of the invention.

In the drawings:

Figure 1 is an elevation of an elemental angle;

Fig. 2 is an end view thereof;

Fig. 3 is a view similar to Fig. 2 showing a modified form of angle;

Fig. 4 is an elevation of the bolt which I employ to secure the elemental members together to form composite members;

Fig. 5 is an axial section through a nut of special form which I provide for cooperation with the bolt of Fig. 4;

Fig. 6 is a partial perspective view of a sheet metal sheathing channel;

Fig. 7 is a sectional view showing a channel composed of a pair of angles such as shown in Fig. 1;

Fig. 8 is a section through a composite I beam;

Fig. 9 is a similar section through a composite Z;

Fig. 10 is a partial elevation of a girder and column in accordance with the invention;

Fig. 11 is an end view thereof;

Fig. 12 is a partial elevation of a different form of girder;

Fig. 13 is an elevation of a still further form of girder;

Fig. 14 is a section through a floor construction embodying the principles of this invention;

Fig. 15 is a diagram showing how it is possible to combine diagonal web members with spaced chord members, all of said members having uniformly spaced holes;

Figs. 16, 17 and 18 are elevations of different forms of truss-like structures which may be assembled by the aid of the invention;

Figs. 19 and 20 are diagrammatic views of further forms of trusses;

Fig. 21 is a sectional view of an assembly of sheathing channels adapted to form a wall;

Figs. 22 and 23 show the manner of connecting cooperating composite members extending at an angle to each other;

Fig. 24 is a partial section through a floor construction;

Fig. 25 is an elevation of a coped connecting angle;

Fig. 26 is a perspective view thereof;

Fig. 27 is an elevation of the angle in use;

Fig. 28 is a sectional view through a floor embodying composite beams and channel sheathing;

Fig. 29 is an elevation of a further form of composite structural members;

Fig. 30 illustrates a means for connecting channels to angles;

Fig. 31 is a perspective view of a wall or ceiling construction;

Fig. 32 is a sectional view therethrough;

Fig. 33 is a view similar to Fig. 31 showing a modified form of construction;

Fig. 34 is a similar view of a further modification;

Fig. 35 is a view partly in section and partly in perspective showing a detail of construction;

Fig. 36 is a partial perspective view showing the manner of using sheet metal channels as roof sheathing;

Fig. 37 is a view partly in section and partly in perspective of a building composed of perforated angles and sheet metal sheathing channels.

Referring in detail to the drawings, I utilize as an elemental member for the building up of composite structures or members, an angle 10, the legs of the angle preferably having lengths bearing the ratio of 2:3. The longer leg of the angle is provided with a series of holes or perforations 11 having their center line spaced inwardly from the edge of the long leg of the angle a distance equal to one-third the total length of the long leg. The centers of adjacent holes are spaced apart by a distance equal to that between the common center line of all the holes and the free edge of the long leg of the angle. A 2" x 3" angle may be used having holes on 1" centers, 1" inwardly of the edge or the long leg.

The angles 10 may be utilized to build up various types of composite members. Fig. 7 shows a channel formed of two angles secured together by bolts 12 extending through alined holes 11. Fig. 8 shows an I-beam 13 similarly assembled and Fig. 9 shows a Z 14.

The bolts employed to secure the angles together are such as illustrated in Fig. 4. The shank of the bolt preferably has a length eight times the thickness of the angle legs and is threaded for half its length. Nuts 15 as shown in Fig. 5 are provided to cooperate with the bolts 12. The thickness of the nut 15 is preferably four times that of the angle leg; the bore through the nut being threaded for only half its length as indicated at 16, the remainder being counter-sunk as at 17.

By leaving half the length of the bolt shank unthreaded I provide solid bearings for the edges of the holes 11 in the angles secured together by the bolts. Because of the counter-bore 17 in the nuts 15, however, it is possible for the nuts to be screwed home sufficiently (as indicated in dotted lines in Fig. 4) to grip tightly only two thicknesses of the angle legs, as would be the case in the channel of Fig. 7. If a greater number of angle legs are clamped together by the bolts, of course, the nuts are advanced only corresponding distances on the bolts.

In certain cases, it is desirable that the angles 10 have grooved or serrated surfaces as shown at 18. When two such angles are placed back to back, as indicated in Fig. 8, the cooperating grooved surfaces of the angles provide means for receiving and holding a fastener such as a nail 19 having a correspondingly roughened or serated shank 20. As shown in Fig. 8, nails 19 might be driven between the angles 10 to secure a flooring 21 to joists such as that formed by the beam 13.

Fig. 3 illustrates a modified form of angle in which the short leg is of double thickness. This form of angle, of course, would increase the strength of members such as shown in Figs. 7 through 9 assembled therefrom.

Fig. 6 illustrates a further elemental construction member in the form of a sheet metal channel 22. The channel has flanges 23 provided with spaced perforations 24. One flange has a pair of rows of perforations while the other flange is bent back on itself as indicated at 25. The use of the channel shown at Fig. 6 for various types of construction will be described more completely hereinafter.

Figs. 10 and 11 illustrate a form of composite structure which may be assembled from the angles 10. A pair of angles are disposed with their short legs in abutment provide a column 26. A girder 27 is composed of longitudinal or chord angles 28 bolted to the vertical angles forming the column 26. Diagonal web members 29 connect the chord members 28, being secured thereto by bolts 12 as shown. The web members 29 may conveniently be formed of short scrap lengths left over when longer pieces are cut to specified dimensions. Since the holes 11 in all the members are uniformly spaced the diagonals must be disposed at one of the two angles permitted by the right triangle relationship indicated in Fig. 15. According to this relationship, the hypotenuse of the triangle is an even number of units long, providing the base and altitude are three and four units respectively or some multiple thereof. This permits considerable variation in the depth of the composite girder 27 and the spacing of the web members therealong.

Fig. 12 illustrates a composite girder having chord and web members such as those shown in Fig. 10 plus vertical web members 30 disposed between the diagonal chord members. By reason of the relations between angle flange widths and hole spacing described above, the holes in the vertical members match those in the chord members whether the vertical members are disposed flange to flange as in Fig. 12, or edge to edge as in Fig. 16.

Fig. 13 illustrates a similar girder with a slightly different arrangement of vertical web members.

Fig. 14 shows a floor construction embodying the principles so far described. A composite girder 31 is composed of two pairs of angles connected by a web plate 32 in a manner which will be described more fully hereafter. By means of connection angles 33, floor joists 34 similar to the girder 27 are secured to the girder 31. Sheet metal channels 22 laid transversely of the floor joists provide sheathing for a floor layer 35. Channels 22 are similarly suspended from below the floor joists and may be provided with a finished ceiling layer 36 as desired. The manner of attaching the channels 22 to the floor joists will be illustrated and described in detail later.

Fig. 16 illustrates a somewhat different form of structure which may be assembled from the angles 10 and channels 22. A truss 37 is composed of longitudinals or chords 38 and verticals or web members 39. The chords, as shown, each comprise a pair of angles 10 disposed so that the edges of their perforated legs abut. The verticals 39 are similarly disposed and are connected to the longitudinals by bolts 12 in the manner shown. Where the truss 37 forms part of a bridge, a floor 40 therefor may conveniently be formed by laying channels 22 in a pair of the trusses disposed side by side, as indicated. Fig. 16 also shows the matching of the holes in the horizontal members with those of vertical members butted edge to edge.

The triangular relation illustrated in Fig. 15 may be taken advantage of in making beams having varying resistance to bending moments. Fig. 17 illustrates an assembly of this. A truss 41 comprises a straight upper chord 42 and a bent lower chord 43, the chords being connected by web members 44 of suitable length. By maintaining the required relation between the base, altitude and hypotenuse of the right triangles formed, an exact fit of all the parts and perfect alinement of the holes is assured.

Fig. 18 illustrates another type of truss including top and bottom chords 45, vertical web members 46 and diagonal web members 47. Other assembles of trusses which may be constructed from the angles 10 are shown in outline in Figs. 19 and 20.

Fig. 21 illustrates the manner of assembling the channels 22 to form a wall having a smooth surface on both sides. A plurality of the channels are first disposed side by side, the straight flange of one channel being inserted in the groove provided by the bent back flange of the adjacent channel. This provides a panel smooth on one side and having flanges projecting from the other. By duplicating this panel, and disposing the flanges of each panel in engagement with the back of the other, as indicated in Fig. 21, I provide a wall which is smooth on both sides. Pins or nails 48 may be passed through the holes 24 to secure the entire structure together. The spaces between the channels may be filled with any type of insulating or sound deadening material indicated at 49.

Fig. 22 illustrates the manner of connecting a horizontal frame member 50 to a column 51 composed of two angles. The horizontal member 51 is secured to one of the angles forming the column 56 by a connecting angle 52. The angles forming the column 51 are connected by short lengths of angle indicated at 53.

Fig. 23 similarly shows the manner of securing a channel 54 composed of two angles 10 disposed with their perforated edges in abutment, to a column such as that shown at 51. This is accomplished by means of a connecting angle 55.

Fig. 24 shows a floor supported on joists 56. Each joist 56 comprises top and bottom chords 57 and web members 58. A spreader strip 59 of felt composition similar to roll roofing is disposed between two angles forming the chords 57. This permits nails to be driven between the angles, whereby a floor 60 and a ceiling 61 may be secured to the joists.

Fig. 25 shows a short length of the angle 10 having a cut corner 62. The perforated flange overhanging the cut corner and bent over as shown at 26 forms a connecting angle 63. This may be conveniently used for connecting horizontal members to vertical members as shown in Fig. 27.

Fig. 28 illustrates in somewhat greater detail, a floor construction which is made possible by this invention. Channels 22 are laid on joists 64 with their flanges extending upwardly. These channels provide a form for a concrete layer 65 in which nailing strips 66 are incorporated. A floor 67 may thereby be nailed over the concrete layer. Before the concrete is poured the channels 22 are maintained in alinement by wires or rods 68 inserted through the holes 24 therein. Channels 22 are also suspended from below the joists 64 by means which will be described, with their smooth surface down. To this may be secured a ceiling finish 69 of any desired character. The webs of the joists 64 being open facilitates passage of conduit through the floors as indicated at 70.

Fig. 29 illustrates a slightly different form of structural member comprising top and bottom chords 71 connected by web plates 72, in a manner disclosed in my aforementioned copending application and diagonal web members 73.

Fig. 30 illustrates the method of securing channels 22 to angles across which they are disposed. A tie 74 has a hook 75 formed at one end and a right angle bend at the other. The hook is secured in a hole in the flange of the channel 22 and the right angle bend is inserted through an adjacent hole in the angle. When the right angled bend is bent down by a hammer blow, for example, the two members are securely fastened together.

Fig. 31 illustrates a further form of wall construction in which angles 10 constitute studs 76. A layer of insulating board is disposed between studs. Channels 22 secured to the studs 76 as shown in Fig. 30 provide a wall sheathing. A nailing strip 78 disposed between adjacent channels permits a fabric or other wall covering 79 to be stretched over the channels and secured in place by nails 80. The joints between adjacent sections of wall covering may be covered by chair rails 81, picture molding, or the like, depending on the location of the joint.

Fig. 32 is an enlarged section of the wall shown in perspective in Fig. 31.

Fig. 33 shows an inside wall which differs slightly from that of Figs. 31 and 32. Channels 22 are secured to both sides of the studs 83 and wall covering 79 is stretched thereover between nails 84 driven between adjacent channels and then bent over. The joints in the wall covering are concealed by chair rail 81 or baseboard 85.

Fig. 34 shows an outside wall which simulates clapboards externally and is provided with preformed wall covering on the inside. Channels 22 are disposed outside studs 86 and secured thereto in a manner already explained. The inner row of holes in the bottom flange of one channel is disposed in alinement with the outer row of holes in the top flange of the next channel below. This provides the outward slope and over-hang simulating the usual clapboard construction. A preformed wall board 87 covers the channels 22 on the inside of the studs 86. The sections of wall board are secured in place by small angles 88 having perforations in one leg adapted to be disposed in alinement with the perforations in the flange of the channels 22. This is shown to an enlarged scale in Fig. 35.

Fig. 36 illustrates the use of the channels 22 to provide a pitched roof. Between the straight flange of one channel and the bent back channel into which it fits, I provide a deep, narrow channel member 89 having oppositely disposed flanges 90 and 91. This channel serves as a weather strip to make the joint between the channels 22 watertight and prevents seepage.

Fig. 37 illustrates a small building constructed in accordance with the invention. Columns 92 carry floor sills 93 and roof trusses 94, all constructed in the manner already explained, from angles 10. The connecting bolts have been omitted, to show clearly the manner in which the holes of the several members to be secured together are in exact alinement. The walls, floors, ceilings and roof of the building are composed of channels 22 and, of course, any desired type of interior or exterior finish may be applied thereover. Hooks 95 are inserted between the roof channels for securing shingles thereto. The width of the flanges of the channels 22 is preferably a multiple of the spacing between the holes 11 in the angles 10. This facilitates connection of the channels to the angles.

The advantages of the invention include the possibility of easily building up various types of structural members, and making connections therebetween to provide a structural steel building frame. Other advantages include the ease of removing wall covering for cleaning or replacement, the fact that an entire building may be constructed by unskilled labor, and the fact that only two elemental construction members are employed, excepting the bolts and other fastening means. Any type of insulation desired may be deposited in the walls formed by the channels. The channels may be preformed or formed on the job from flat strip by a simple bending machine. Walls composed of these channels provide a flat background which is necessary for many modern wall finishes without the necessity of a plaster coat which is expensive and always subject to warpage and shrinkage. The types of structures which can be built by use of the invention are practically innumerable. In view of the knock-down type of construction characterizing the invention furthermore, a salvage value of one-hundred percent is secured.

Although I have illustrated and described herein but one preferred embodiment with certain modifications, it will be apparent that changes in the construction shown may be made without departing from the spirit of the invention or the scope of the appended claims.

I claim:

1. A metal building member comprising spaced chord members and connecting web members, each of said members being composed of an angle bar having holes uniformly spaced along a center line parallel to an edge thereof, the distance between said center line and the corner of said angles being an integral multiple of the center-to-center spacing between adjacent holes.

2. A metal building member comprising spaced chord members and connecting web members, each of said members being composed of an angle bar having holes uniformly spaced along a center line parallel to an edge thereof, the distance between said center line and an edge of said angles being an integral multiple of the center-to-center spacing between said holes.

ALBERT HENDERSON.